Aug. 29, 1961     W. GÜNTERT     2,998,518
TOMOSCOPE
Filed May 3, 1957
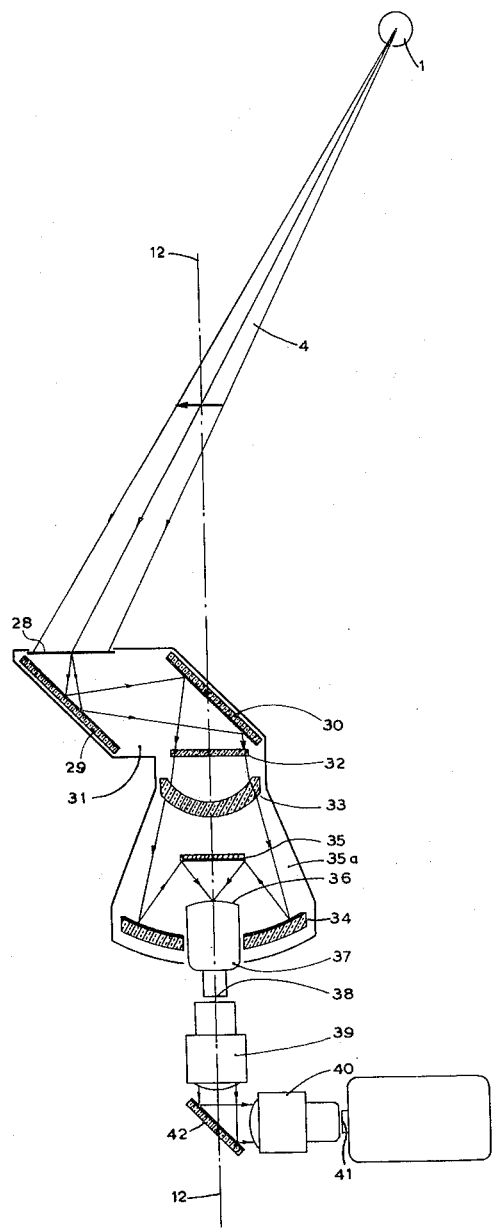
WALTER GÜNTERT *INVENTOR.*
BY
Wenderoth, Lind & Ponack
Attys

United States Patent Office 2,998,518
Patented Aug. 29, 1961

2,998,518
TOMOSCOPE
Walter Güntert, Aarau, Switzerland, assignor to N. V. Optische Industrie "De Oude Delft," Delft, Netherlands
Filed May 3, 1957, Ser. No. 656,815
Claims priority, application Netherlands May 9, 1956
4 Claims. (Cl. 250—65)

The invention relates to a device for examining layers in bodies, particularly the human body, by means of X-rays, gamma rays or the like. Devices permitting the radioscopy of layers in human bodies are known and will be referred to in the following description as tomoscopes. They generally are provided with a source of radiation and a receiver of radiation which are so arranged as to be synchronically moved along paths in different parallel planes, such that the central ray is constantly passing through a fixed point located in the space between said parallel planes and is always directed to one and the same point of the receiver surface. Means are provided for observing the radioscopic image formed by the moving receiver as a still tomoscopic image.

In one known device of the type referred to the receiver surface is formed by the photo cathode of an image amplifier tube, the fluorescent screen of said tube providing a bright tomoscopic image which may be viewed by means of a system of optical articulations connected to an eye piece which is fixedly located in space.

Though in some instances satisfactory results may be obtained with a tomoscope of the construction described some mechanical and electrical problems present themselves which are likely to disturb the smooth functioning of the device and may give rise to serious failures.

In practice it would be difficult to support the image amplifier tube so as to avoid serious vibrations, even in those cases where the source and receiver simply describe circular paths. Also the supply of high voltage electrical energy to the image amplifier tube would constitute a source of serious troubles in operation and would necessitate a very careful maintenance.

Moreover it will be observed that the image obtained from the curved photo cathodes of present image amplifier tubes will correspond to a similarly curved layer in the body under examination, which is undesirable especially if the image has to be compared with tomographs previously taken on a flat X-ray film and thus representing flat body layers. Another serious drawback is seen in the fact that the photo cathodes of presently available image amplifiers are much too small to provide a tomoscopic image of layers of sufficient lateral dimensions at one time. Therefore much time has to be spent in searching for images having diagnostical value. A still further disadvantage is that the image forming and transmitting parts of the known device have to be arranged above the patient table thus leaving only a small space for the patient lying on the table which complicates the operations.

The invention has for its object to overcome the difficulties described. According to the invention the radiation receiver is a fluorescent screen and an optical system is provided which projects an image of said fluorescent screen on the photo cathode surface of an image amplifier, which is positioned on the axis of rotation of the tomoscope. Preferably those parts of the optical system which actually serve the imagery are also positioned on the optical axis and the lateral displacement between the axes of the fluorescent screen and the photo cathode of the image amplifier may be realized by two rotating mirrors arranged under an angle with respect to said axes so as to reflect light rays from the screen on to the photo cathode.

The invention will be discussed in some details with reference to the drawing in which a tomoscope embodying the invention is schematically shown by way of example.

In the drawing 1 is a source of radiation, e.g. an X-ray tube which can be rotated about the axis 12 by any appropriate means. Said means do not constitute part of the invention and may be constructed in various ways which are well-known to those skilled in the art. Opposite the source 1 a fluorescent screen 28 is mounted in a housing 31 which is rotatable about the axis 12 and is supported by a second housing 35a which is fixedly mounted. Housing 31 contains two flat mirrors 29 and 30 which reflect light rays emitted by the fluorescent screen 28 so as to enter the housing 35a. The latter housing receives a mirror objective system of conventional design, comprising a concave spherical mirror 34, a meniscus shaped correcting lens 33 whose surfaces are concentric to the concave mirror 34, a lens element 32 having a slightly conical surface for further reducing the spherical aberration of the system, and a flat mirror 35 which projects the image of the screen 28 on the photo cathode 36 of the image amplifier tube 37.

It will be understood that in operation the source 1 and the fluorescent screen 28 are moving in parallel circular paths and have in their paths a phase difference of 180°. Thus the central ray of the beam 4 radiated by the source 1 which always intersects the axis 12 in a fixed point is constantly striking the fluorescent screen 28 in one and the same point. A well-defined image of the layer indicated by a horizontal arrow of a body which is positioned between the source of radiation 1 and the fluorescent screen 28 will be formed on the fluorescent screen 28 and the images of layers positioned above or below said first mentioned layer will fade out due to the constant movement of the source and receiver.

If the fluorescent screen 28 is fixedly mounted in the housing 31 its characteristics should be such that the fluorescence of a point of the screen surface is suppressed abruptly after said point is no longer hit by a ray, otherwise the rotation of the screen would cause blurred images due to a zone of gradually decreasing brightness following each line of the image. It is also possible, however, to use "slower" screens, but then means have to be provided for avoiding relative movements of the screen with respect to the image formed on it by the beam 4. The fixed orientation in space of the screen 28 may be obtained by any conventional means, such as a set of gears coupling the circular screen 28 to the axis of rotation 12.

An image amplifier tube 37 is fixedly arranged with its axis along the axis of rotation 12 of the tomoscope and is projecting into the optical system through an aperture in the spherical mirror 34, so as to have its photocathode located in the image surface of the optical system. It will be observed that the flat mirror 35 serves to reflect the light rays travelling to the focal surface of the spherical mirror 34 so that the image is formed at a location which may conveniently be reached by the image amplifier.

The image surface (fluorescent screen) 38 of the image amplifier 37 is, in turn, imaged on the photo-sensitive plate 41 of a conventional television camera by a symmetrical lens system 39, 40 of high luminosity and magnification one. A flat mirror 42 is arranged between the two components 39 and 40 under a 45° angle with respect to the optical axis 12 in order to reduce the height required for the optical and electrical apparatus below the image amplifier. The optical systems 39 and 40 being identical in construction and forming together a symmetrical objective for 1:1 imagery, the light rays leaving the lens system 39 are thus parallel to each other.

It is to be understood that the provision of a television camera for viewing the image formed by the image amplifier 37 is only meant as an example and clearly does not present a limitation of the scope of the present invention. The fluorescent screen 38 of the image amplifier may as well be viewed directly by means of a suitable microscope or photographed, by any suitable camera, if desired.

Furthermore it will be appreciated that, though of course it is preferred to have the image amplifier as well as the optical imaging system made stationary so that only the fluorescent screen 28 and the mirrors 29 and 30 have to be moved, it is yet possible to rotate the optical system or the amplifier or both about the axis 12, without giving up some of the important advantages of the present invention.

What I claim is:

1. A device for producing images of a thin section of a stationary object, particularly the human body, comprising a source of X-ray type radiation disposed on one side of the object, means for moving said source along a circular path lying in a first flat plane, a fluorescent screen disposed on the other side of said object for collecting said radiation after its passage through said object and converting the same into an optical image, means for moving said fluorescent screen in synchronism to said source along a circular path lying in a second flat plane parallel to said first plane, said source and said screen having a common axis of rotation whereby, in operation, the central ray of the beam transmitted by said source is constantly passing through a point fixedly located in the space between said first and second plane and is at any time directed to one and the same point of said screen, an image amplifier fixedly mounted in said axis of rotation, and an optical system between said screen and said image amplifier for projecting a stationary image of said screen on the photo-cathode of said image amplifier.

2. A device for producing images of a thin section of a stationary object, particularly the human body, comprising a source of X- or like radiation disposed on one side of the object, means for moving said source along a circular path lying in a flat plane, a housing disposed on the other side of said object, means for rotating said housing in synchronism to said source around an axis of rotation perpendicular to said plane and passing through the center of said circular path, the wall of said housing having an aperture therein in excentric position with respect to said axis of rotation, a fluorescent screen in said aperture for collecting said X-radiation after its passage through said object and for converting the same into an optical image, a pair of plane reflecting surfaces mounted parallel to each other in said housing at an oblique angle with respect to said axis of rotation so as to successively reflect light rays transmitted by said screen, an image amplifier fixedly mounted in said axis of rotation of said housing and an optical imagery system in axial alignment with said image amplifier for collecting light rays reflected by said reflecting surfaces and forming a stationary image of said screen on the photo-cathode of said image amplifier.

3. A device for producing images of a thin section of a stationary object, particularly the human body, comprising a source of X- or like radiation disposed on one side of the object, means for moving said source along a circular path lying in a flat plane, a rotatable housing disposed on the other side of said object, the axis of rotation of said housing being perpendicular to said plane and passing through the center of said circular path, means for rotating said housing in synchronism to said source, the wall of said housing having an aperture therein in excentric position with respect to said axis of rotation, a fluorescent screen in said aperture for collecting said X-radiation after its passage through the object and for converting the same into an optical image, a pair of plane reflecting surfaces mounted parallel to each other in said housing at an oblique angle with respect to said axis of rotation so as to successively reflect light rays transmitted by said screen, an image amplifier fixedly mounted in said axis of rotation of said housing, an optical imagery system in axial alignment with said image amplifier for collecting light rays reflected by said reflecting surfaces and forming a stationary image of said screen on the photocathode of said image amplifier, a stationary mount for said optical imagery system, and bearing means on said mount for rotatably supporting said housing.

4. A device for producing images of a thin section of a stationary object, comprising a source of X-ray type radiation disposed on one side of the object, means for moving said source of radiation in accordance with tomographic motion, a fluorescent screen on the other side of the object, an image amplifier fixedly mounted in the axis of the tomographic motion, and an optical system between said image amplifier and said fluorescent screen for receiving light rays from said fluorescent screen and conducting it to said image amplifier, said optical system being operatively connected to said means for moving at least the portion of said optical system adjacent said fluorescent screen in accordance with the tomographic motion.

References Cited in the file of this patent

UNITED STATES PATENTS

| | | |
|---|---|---|
| 2,110,953 | Grossmann | Mar. 15, 1938 |
| 2,667,585 | Gradstein | Jan. 26, 1954 |